May 19, 1970  R. L. LICH  3,512,482
RESILIENT RAILWAY VEHICLE TRUCKS
Filed Oct. 24, 1968  3 Sheets-Sheet 2

INVENTOR
RICHARD L. LICH
BY Bedell & Burgess
ATTORNEYS

United States Patent Office 3,512,482
Patented May 19, 1970

3,512,482
RESILIENT RAILWAY VEHICLE TRUCKS
Richard L. Lich, Town and Country, Mo., assignor to General Steel Industries, Inc., Granite City, Ill., a corporation of Delaware
Filed Oct. 24, 1968, Ser. No. 770,146
Int. Cl. B61f 5/26, 5/10, 3/02
U.S. Cl. 105—224.1                                    10 Claims

ABSTRACT OF THE DISCLOSURE

A railway vehicle truck in which light weight and simplicity of construction, along with improved riding qualities and less maintenance are achieved by forming the journal boxes with upwardly open inverted conical wings, providing the truck frame with depending inverted conical elements at both sides of each journal box and receiving them in the journal box wings, and positioning a conical annulus of elastomeric material between the mating conical surfaces of the wings and conical elements whereby the journal boxes are freely vertically movable with respect to the frame through shear in the elastomeric annuli but are guided vertically by the resistance of the elastomeric annuli to compression, and vertically acting springs between the journal boxes and the truck frame for supporting the truck frame on the journal boxes. The truck is additionally simplified and lightened by the provision of a vertical cylindrical aperture through the frame side members, in which is matingly received the depending cylindrical surge chamber of a flexible-wall pneumatic cushion device, seated on the upper surface of the side members, which are depressed between the axles to provide lower height. A transverse load supporting bolster is carried on the pneumatic springs.

BACKGROUND OF THE INVENTION

Field of the invention

The invention relates to railway rolling stock and consists particularly in an improved light weight, simplified railway vehicle truck.

Description of the prior art

Conventional railway vehicle trucks of the rigid frame type usually have their frames formed with pairs of depending pedestal legs embracing and vertically slidably receiving the journal boxes mounted on the ends of the axles, and in some instances, the journal boxes mount upright coil springs which underlyingly support the truck frame. The frictional engagement of the journal boxes and pedestal legs creates wear and noise, and transmits vibrations directly from the track to the truck frame. The provision of pedestal legs on the truck frame substantially increases its complexity. In such conventional trucks, when pneumatic cushions are provided, the truck frame is frequently formed with a separate reservoir or surge chamber for each spring, which may substantially increase the complexity and weight of the frame, particularly if the frame is of cast construction.

DESCRIPTION OF THE PREFERRED EMBODIMENT

Figure 1:
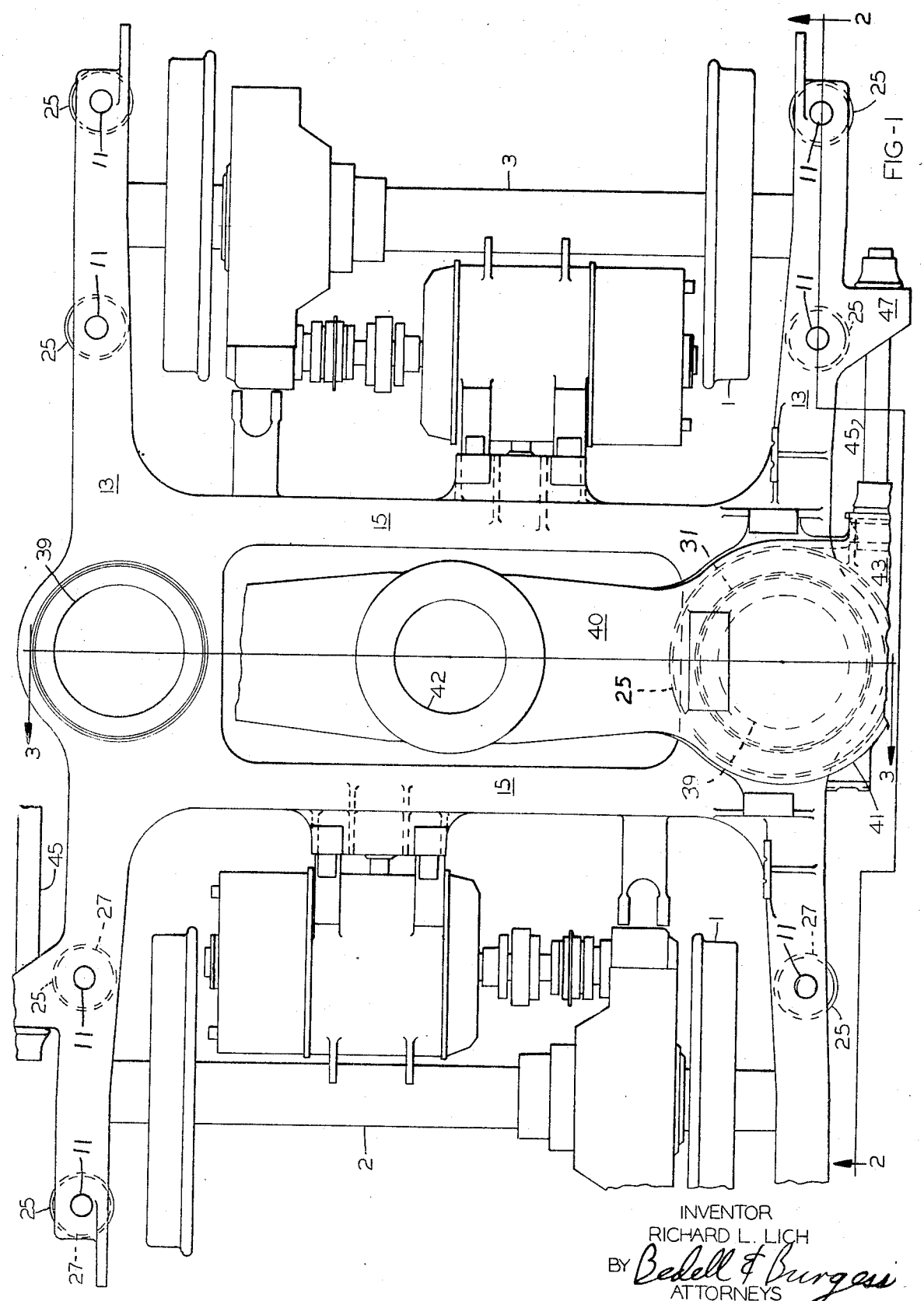
FIG. 1 is a top view of a truck embodying the invention.
Figure 2:
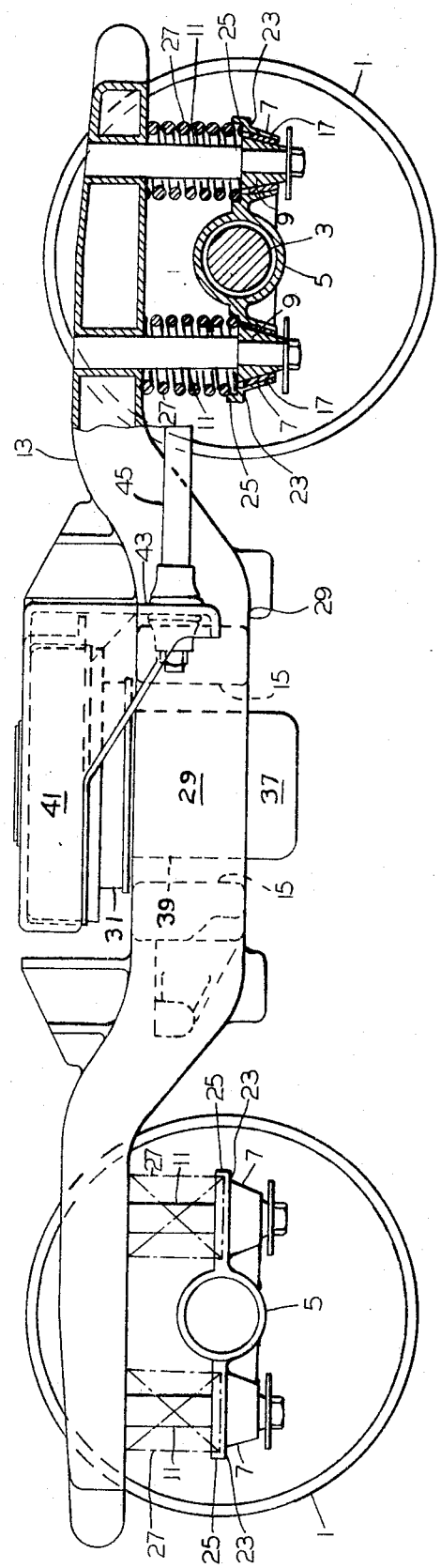
FIG. 2 is a side elevational view partially sectionalized along line 2—2 of FIG. 1.
Figure 3:
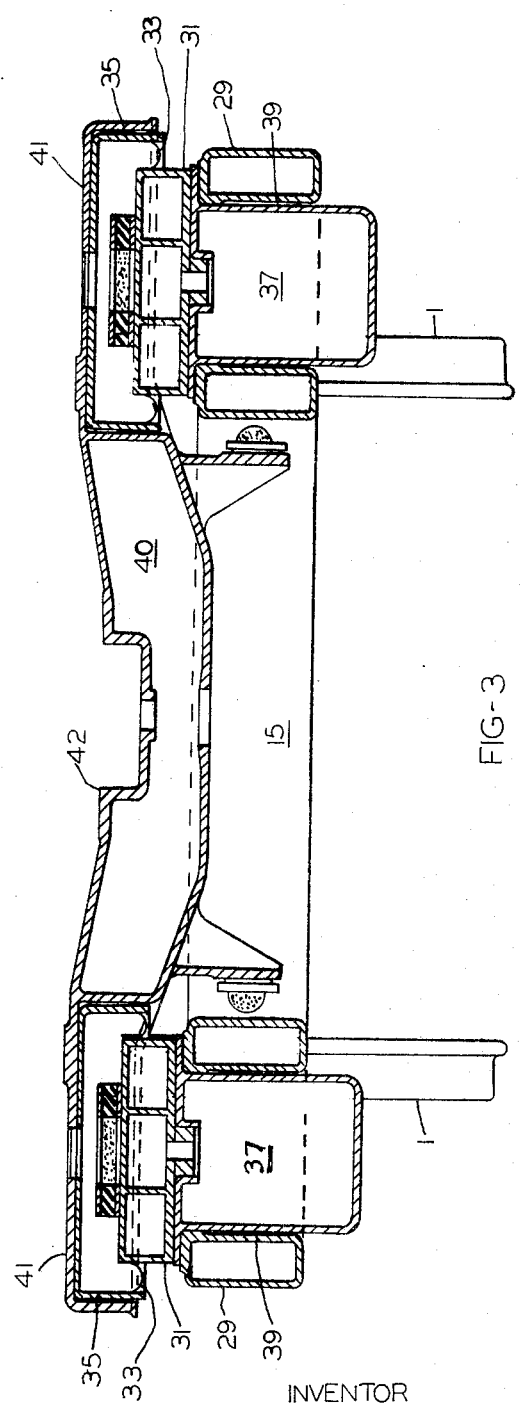
FIG. 3 is a transverse vertical sectional view along line 3—3 of FIG. 1.

The numeral 1 refers to railway flanged wheels, mounted in transversely spaced pairs on parallel axles 2 and 3. Axles 2 and 3 are rotatably received, at their ends, in journal boxes 5.

Journal boxes 5 are each formed with wings 7 extending in both directions longitudinally of the truck. Wings 7 are of inverted conical shape and are hollow. Within each wing 7 is received a centrally apertured inverted conical element 9, similar in shape to wing 7, but of smaller size. Conical elements 9 are rigidly secured to upright rods 11 which extend through their central aperture, and the upper end portions of vertical rods 11 are received in and secured to the end portions of truck frame side members 13.

Truck frame side members 13 extend longitudinally of the truck outboard of the wheels, and, intermediate axles 2 and 3, are rigidly connected to each other by longitudinally spaced transversely extending center transoms 15. In the conical annular spaces between the inner surfaces of wings 7 and conical elements 9, conical annuli 17 of elastomeric material are positioned. The resistance of elastomeric annuli 17 to compression constantly prevents journal boxes 5 from moving transversely or longitudinally with respect to truck frames 13, 15, while the shear yieldability of annuli 17 permits substantially free vertical movement of the journal boxes with respect to the truck frame.

For supporting the truck frame on the journal boxes, the upper ends of journal box wings 7 are outwardly flared to form horizontal flanges 23 with upstanding rims 25, and upright coil springs 27 are seated on flanges 23, with their upper ends underlyingly engaging frame side members 13. The vertical spacing of conical members 9 from the spring cap is preferably equal to the height of coil springs 27 under the light weight of a supported car, so that annuli 17 are freely yieldable through the range of light to loaded condition of the car, wi th a dynamic increment at either end of the range. As a result of this, the steep inclination of the conical surfaces, and the low shear rate of the annuli, annuli 17 offer negligible resistance to vertical movement of the journal boxes, while offering positive vertical guidance by their resistance to transverse compression.

Between the axles, frame side members 13 are widened and depressed to a level substantially lower than their end portions, as at 29, to support on their upper surfaces the rigid base members 31 of a flexible-wall pneumatic cushion device having a flexible diaphragm 33, and a rigid top member 35. In accordance with the invention, a deep cylindrical surge chamber 37, of less diameter than the shallow base portion 31, is rigidly secured to the bottom of the latter with which it communicates by a small orifice, and the central portion of the frame side members is formed with a vertical cylindrical aperture 39 to receive surge chambers 37. Thus the requirement for a separate surge chamber for each cushion device, incorporated in the truck frame, or bolster, as in conventional constructions, is eliminated, along with the need for piping, seals and the like between a separate surge chamber and its associated spring.

A transverse load supporting bolster 40 has downwardly open cup-shaped ends 41, which matingly receive and rest on pneumatic cushion device top members 35. At both sides of the truck, the ends of the bolster are formed with depending brackets 43, to which are pivotally connected longitudinally extending anchor links 45, the other ends of which are pivotally connected to brackets 47 projecting outwardly from truck frame side members 13. By means of anchors 45, longitudinal (draft and braking) forces are transmitted between the truck frame and the bolster. For swivelly supporting a car underframe, bolster 40 is provided at its center with an upwardly facing central bearing 42.

Figure 4:
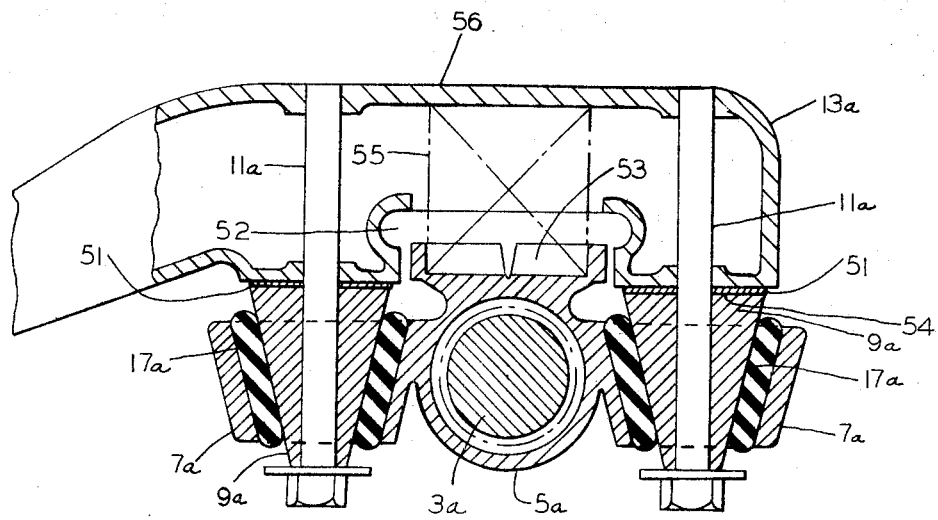
FIG. 4 is a fragmentary view of a truck showing a modified journal box support and guidance arrangement.

A modified form of primary suspension is illustrated in FIG. 4, in which journal boxes 5a are formed with longitudinally extending wings 7a, generally similar to wings 7 of the previous embodiment, but lacking the upper flange (23) and rim (25), and mating conical elements 9a are secured to vertical rods 11a which project downwardly from box section frame side members 13a, the upper ends of conical elements 9a being in engagement with longitudinally spaced apart downwardly facing horizontal surfaces 51 of frame side members 13a. Intermediate surfaces 51, the bottom web of side members 13a is opened, as at 52, and journal box 5a is formed with an upwardly facing spring seat 53 on its top surface. A vertical coil spring 55, seated on seat 53, extends upwardly through opening 52 into the hollow interior of frame side member 13a and supports the frame by engagement with side member top web 56. As in the previous embodiment, rubber annuli 17a are so positioned vertically with respect to the truck frame that they will be freely yieldable through the range of light to loaded condition of the supported car, with a dynamic increment at both ends of the range. For adjustment, shims 54 may be positioned between conical elements 9a and the opposing surfaces 51 of frame side members 13a.

Figure 5:
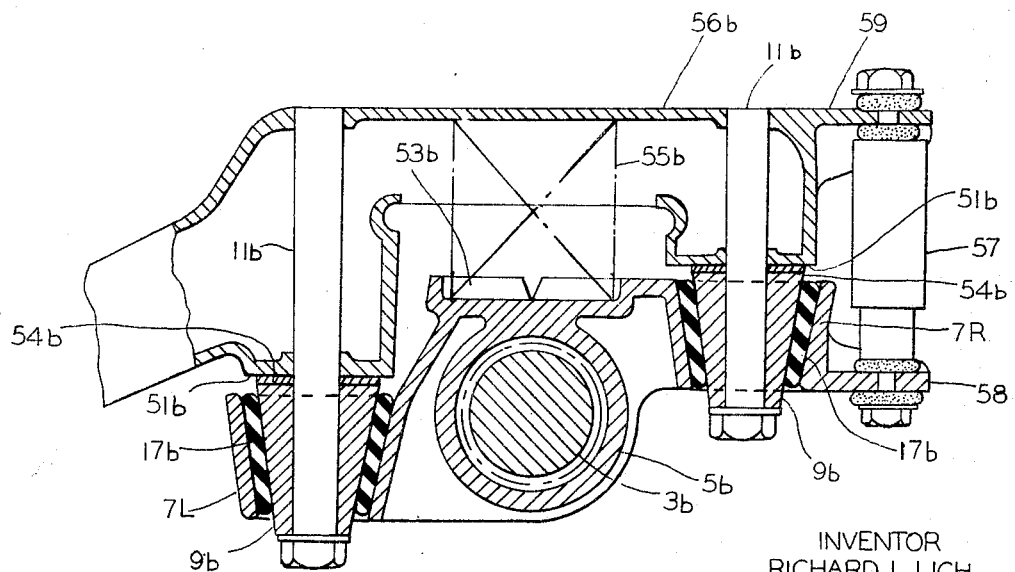
FIG. 5 is a fragmentary view of a truck showing a second modified journal box support and guidance arrangement.

A further modified form of primary suspension is illustrated in FIG. 5, in which elements corresponding to those in the previously described views bear the same numbers followed by the letter b. In the embodiment of FIG. 5, journal boxes 5b are formed with longitudinally extending wings 7L and 7R, generally similar to wings 7a of the second embodiment, but offset vertically from each other, respectively below and above the horizontal diameter of the journal box so as to offer additional anti-rotational stability to the journal box in the event an unbalanced load, such as that of shock absorber 57 connected to a bracket 58 on the journal box longitudinally outboard of wing 7R and to a bracket 59 on the end of truck frame side member 13b. The unidirectional longitudinal forces exerted by both guide devices on the journal box act through a vertical arm equal to their vertical spacing from each other to provide a moment opposing tendencies of the box and structure mounted thereon to rotate about the axle and thus relieve the frame supporting spring 55b of this function.

The details of the railway truck suspensions disclosed herein may be varied substantially without departing from the spirit of the invention and the exclusive use of those modifications as come within the scope of the appended claims is contemplated.

I claim:

1. In a railway vehicle truck, spaced wheeled axles, journal boxes rotatably mounted on said axles, upright springs carried by said journal boxes, a truck frame including longitudinally extending side members supported on said springs and having vertically depending inverted generally frustoconical elements adjacent both sides of each of said journal boxes, said journal boxes being formed with wings having frustoconical surfaces in mating spaced relation with said depending frustoconical elements, elastomeric annuli between the mating surfaces of said wings and said elements, said elastomeric annuli having their top and bottom rim surfaces free of engagement with horizontal surfaces of said truck frame and journal boxes respectively, said frame side members being depressed between said axles and there being widened substantially symmetrically transversely of the truck, a generally vertical cylindrical aperture through the widened portion of each frame side member, a flexible-wall pneumatic spring having its base seated on said widened portion of each said side frame and having a depending cylindrical rigid wall surge chamber matingly side member apertures, and a transverse load supporting bolster carried by said pneumatic springs.

2. In a railway vehicle, a wheeled axle, a journal box thereon, upright spring means carried by said journal box, structure supported on said spring means, conical elements depending vertically from said supported structure at both sides of said journal box, said journal box being formed with wings having conical surfaces in mating spaced relation with said conical elements, and elastomeric annuli between the mating surfaces of said wings and said conical elements, said elastomeric annuli having their top and bottom rim surfaces free of engagement with horizontal surfaces of said supported structures and said journal box.

3. In a railway vehicle truck according to claim 2, said wings being provided with spring seat portions, said upright springs comprising a pair of springs seated on said wing spring seat portions and underlyingly engaging said supported structure.

4. In a railway vehicle truck according to claim 3, rods depending from said supported structures at both sides of each said journal box and mounting said frustoconical elements in vertically spaced relation below said supported structure.

5. In a railway vehicle truck according to claim 2, said conical elements being in vertically proximate relation with said supported structure, said spring being seated on top of said journal box.

6. In a railway vehicle truck according to claim 5, said supported structure being formed with a downwardly open recess above said journal box to receive said spring.

7. In a railway vehicle truck according to any one of claim 2, 5 or 6, said wings on opposite ends of each said journal box being vertically offset from each other respectively above and below the axle center.

8. In a railway vehicle truck according to claim 2, said element and said wings being of inverted conical shape, said wings being hollow and receiving said elements in their interiors.

9. In a railway vehicle truck having longitudinally spaced wheeled axles, frame side members elongated lengthwise of the truck and supported from said axles, said frame members being widened substantially symmetrically intermediate said axles and there centrally formed with generally vertical cylindrical apertures, pneumatic cushion devices having their bases seated on said frame members and having cylindrical rigid wall surge chambers depending from their bases projecting downwardly substantially their full height into said apertures.

10. In a railway vehicle truck according to claim 9, a pair of transverse transoms connecting said side members intermediate said axles and defining longitudinally of the truck the limits of said side members widened portions.

References Cited

UNITED STATES PATENTS

| 2,181,908 | 12/1939 | Mussey | 105—224.1 XR |
| 2,273,201 | 2/1942 | Holland et al. | 105—224 XR |
| 2,758,549 | 8/1956 | Lich. | |
| 3,200,771 | 8/1965 | Dobson et al. | |

FOREIGN PATENTS

| 23,452 | 6/1962 | Germany. |
| 1,109,727 | 6/1961 | Germany. |

ARTHUR L. LA POINT, Primary Examiner

H. BELTRAN, Assistant Examiner

U.S. Cl. X.R.

105—172, 197, 206, 226

PO-1050
(5/69)

UNITED STATES PATENT OFFICE
CERTIFICATE OF CORRECTION

Patent No. 3,512,482  Dated  May 19, 1970

Inventor(s)   Richard L. Lich

It is certified that error appears in the above-identified patent and that said Letters Patent are hereby corrected as shown below:

Column 3, line 37, "in the event an" should read:  --in the event of an--;
         line 73, "each said side frame" should read: --each said frame side member--;
Column 4, between lines 1 and 2, insert: --received substantially throughout its depth in said frame--;
         lines 16, 21, 26, 30, 34 and 38 (in the first line of claims 3-8 inclusive): "In a railway vehicle truck" should read:  --In a railway vehicle--.

Signed and sealed this 3rd day of August 1971.

(SEAL)
Attest:

EDWARD M. FLETCHER, JR.        WILLIAM E. SCHUYLER, JR.
Attesting Officer                 Commissioner of Patents